(No Model.)
J. P. F. CARTIER.
OIL PRESS.
No. 338,034. Patented Mar. 16, 1886.
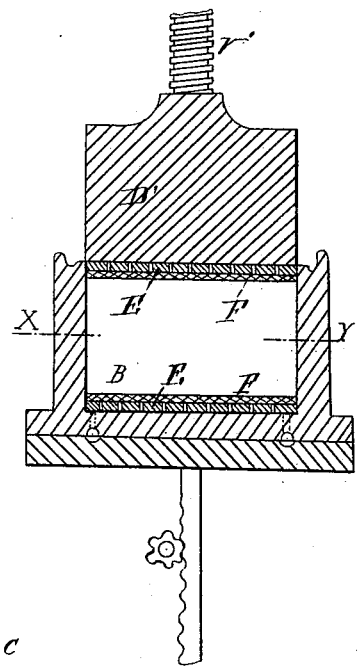
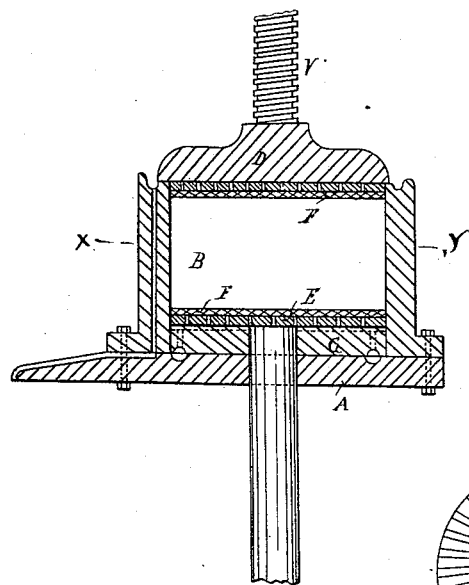
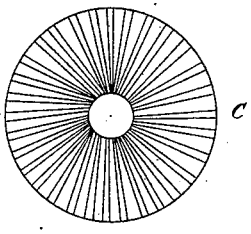
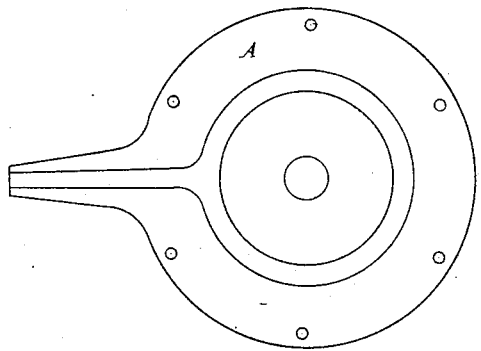
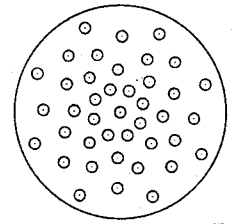
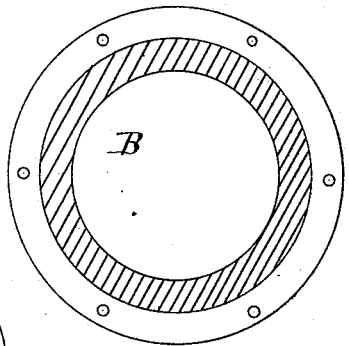
Witnesses:
E. Everett Ellis
J. F. White
Inventor:
Jean P. F. Cartier
By O. E. Duffy
Atty.

United States Patent Office.

JEAN PIERRE FRANÇOIS CARTIER, OF DOUSSARD, FRANCE.

OIL-PRESS.

SPECIFICATION forming part of Letters Patent No. 338,034, dated March 16, 1886.

Application filed July 11, 1884. Renewed February 2, 1886. Serial No. 190,638. (No model.) Patented in France December 20, 1883, No. 159,349.

*To all whom it may concern:*

Be it known that I, JEAN PIERRE FRANÇOIS CARTIER, a citizen of the French Republic, residing at Doussard, France, have invented a new and useful Oil-Press, of which the following is a specification.

Figure 1 shows a vertical section of one form of this apparatus; Fig. 2, a similar view of another form; Fig. 3, a plan of the base-plate; Fig. 4, a section on line $x$ in either of Figs. 1 and 2; Fig. 5, a plan of a perforated plate, E, hereinafter referred to. Fig. 6 represents a plan or top view of the piston.

This apparatus consists of a cylinder or vessel, B, of preferably cylindrical shape, resting on a base-plate, A, having an aperture in the center and a gutter or channel and spout. (See Fig. 3.) Through the central aperture in the plate A passes the rod of a piston or hydraulic ram. (Not shown.) The piston-head C moves in the aforesaid cylinder B. At its lower part it has a channel corresponding with that of the base-plate, and is suitably perforated. The piston carries a plate, E, also perforated and covered with a filter-cloth, F, say, of hair or wool.

The top of the vessel B is covered with a lid, D, also provided with a perforated plate, E, and a filter-cloth, F. The lid can be raised or lowered by a screw, V. On the top of the vessel there is a channel for gathering the liquid forced out at the top. It may be connected with the spout. (See Fig. 1.)

The apparatus as described, and shown in Fig. 1, is intended to be worked by hydraulic power; but a hand-press embodying this invention has a plunger, D', at the top of the vessel and actuated by a screw, V, or equivalent, the bottom being capable of being raised by a rack-and-pinion arrangement. The construction is otherwise substantially the same as that of the hydraulic press, and will be understood from the foregoing description.

Having now described the nature of my said invention and in what manner the same may be carried into practical effect, I wish it to be understood that what I claim, and desire to protect by United States Letters Patent, is—

In oil-presses, the combination of base A, having central aperture and formed with circular channel and spout, vessel B, having in its top a channel communicating with said spout, perforated piston carrying the perforated plate covered with filtering material, and the cover D, also provided with a perforated plate and filtering media, substantially as described.

In witness whereof I have hereto set my hand.

JEAN PIERRE FRANÇOIS CARTIER.

Witnesses:
   O. E. DUFFY,
   A. L. DUFFY.